United States Patent [19]
Keen

[11] Patent Number: 5,664,091
[45] Date of Patent: Sep. 2, 1997

[54] METHOD AND SYSTEM FOR AVOIDING UNNECESSARY RETRANSMISSIONS USING A SELECTIVE REJECTION DATA LINK PROTOCOL

[75] Inventor: Henry D. Keen, St. Paul, Minn.

[73] Assignee: NCR Corporation, Dayton, Ohio

[21] Appl. No.: 524,021

[22] Filed: Aug. 31, 1995

[51] Int. Cl.$^6$ .................................................. C06F 11/00
[52] U.S. Cl. .......................... 395/182.16; 395/185.02; 371/32
[58] Field of Search .................... 395/182.16, 182.15, 395/182.14, 185.02; 371/32, 33, 34

[56] References Cited

U.S. PATENT DOCUMENTS

| | | | |
|---|---|---|---|
| 4,439,859 | 3/1984 | Donnan | 371/32 |
| 4,970,714 | 11/1990 | Chen et al. | 370/17 |
| 5,036,518 | 7/1991 | Tseung | 371/32 |
| 5,084,877 | 1/1992 | Netravali et al. | 371/32 |
| 5,216,675 | 6/1993 | Meilliar-Smith et al. | 371/32 |
| 5,313,473 | 5/1994 | Darmon et al. | 371/35 |
| 5,319,648 | 6/1994 | Bux et al. | 371/32 |
| 5,327,426 | 7/1994 | Dolin et al. | 370/85.13 |
| 5,377,188 | 12/1994 | Seki et al. | 371/32 |
| 5,440,545 | 8/1995 | Buchholz et al. | 371/32 |
| 5,444,718 | 8/1995 | Ajzak et al. | 371/32 |

OTHER PUBLICATIONS

Neufeld et al., "A Request/Response Protocol for ISO Remote Operations", IEEE, pp. 623–627. 1990.

Zoman et al. "Automatic Retransmission Rather Than Automatic Repeat Request", IEEE, pp. 48–55. 1994.

International Standard ISO/IEC 7809:1993 (E) Entitled "Information Technology –Telecommunications and Information Exchange Between Systems –High–Level Data Data Link Control (HDLC) Procedures –Classes of Procedures".

Primary Examiner—Robert W. Beausoliel, Jr.
Assistant Examiner—Joseph E. Palys
Attorney, Agent, or Firm—Davy E. Zoneraich

[57] ABSTRACT

A method and system for controlling the retransmission of data packets which monitors the successive progression of cycles of round trips of message signal transmissions between a transmitter and at least one receiver for avoiding unnecessary retransmissions of data packets which are detected as incorrect during the transmission of sequentially numbered data packets of a data file. Data representative of the progress of cycles are included in the data fields of message signals transmitted to communication devices. Another copy of a data packet is not retransmitted pursuant to a request for retransmission unless the data values related to cycle progression indicate that the last transmitted copy of the data packet was not in transit to the communication device requesting the retransmission at the time the device issued the request. Unnecessary retransmissions in multicast communication sessions are prevented by monitoring the progression of cycles and delaying the retransmission of data packets scheduled for retransmission to compensate for the propagation delay to the receiving device furthest from the transmitting device.

43 Claims, 7 Drawing Sheets 5,664,091

1

METHOD AND SYSTEM FOR AVOIDING UNNECESSARY RETRANSMISSIONS USING A SELECTIVE REJECTION DATA LINK PROTOCOL

FIELD OF THE INVENTION

This invention relates generally to communication systems which provide for the transmission of sequentially numbered data packets from a transmitter to at least one receiver. More particularly, the present invention concerns techniques for controlling the retransmission of data packets which are detected as incorrect for avoiding unnecessary retransmissions during the transmission of sequentially numbered data packets from a transmitter to at least one receiver.

BACKGROUND OF THE INVENTION

Data communication systems which provide for the transmission of a data file of information using sequentially numbered data packets are known. These systems currently operate according to high level communication system control procedures such as the high level data link control (HDLC) procedure. For a detailed description of the HDLC protocol, see International Standard ISO/IEC 4335: 1993, "Information technology—Telecommunications and information exchange between systems—High-level data link control (HDLC) procedure—Elements of Procedures", incorporated by reference herein. In these systems, a virtual connection is established from a transmitter to at least one receiver. The receiver monitors the incoming transmission for determining whether any of the data packets in the sequence are incorrect, in other words, missing from the sequence or unreadable as received. According to standard communication system operating protocols such as HDLC, the receiver which detects the data packet as incorrect issues a message signal requesting the retransmission of that data packet.

Several transmission system protocols are presently available for controlling the retransmission of data packets which are detected as incorrect. The "go back N" or reject retransmission protocol, for example, provides that a receiver which detects an incorrect data packet issue a message signal requesting the retransmission of all data packets starting sequentially from the data packet detected as incorrect. The reject protocol further requires that the receiver discard from memory those correctly received data packets which have sequence numbers that are higher than that corresponding to the data packet detected as incorrect. See ISO/IEC Standard 4335, cited above, for a detailed description of the reject retransmission protocol. The reject retransmission protocol, thus, unnecessarily requires the retransmission of data packets which are otherwise received correctly, thereby severely degrading transmission throughput.

The selective rejection data link protocol, described in further detail in ISO/IEC Standard 4335, cited above, represents another technique for controlling the retransmission of data packets. In general, selective rejection provides that a receiver issue responsive message signals to request for status message signals that a transmitter issues for requesting the status of data packets detected as incorrect at the receiver. A responsive message signal includes a request for the retransmission of only those data packets which are detected as incorrect. Data packets having sequence numbers which are higher than that of the data packet detected as incorrect and which have been correctly received at the receiver are not discarded and, thus, not included in the request for retransmission.

The selective rejection protocol reduces some unnecessary retransmissions that otherwise may be performed. However, this protocol may still cause unnecessary transmissions because of an inherent incapability of tracking requests for retransmission that is related to the propagation delay associated with the transmission of message signals between a transmitter and a receiver. For example, a duplicate request for retransmission of a data packet may be received at a transmitter after that data packet has already been retransmitted because, at the time the duplicate request was issued, the retransmitted data packet was in transit towards the receiver.

Several variations of the selective rejection protocol exist which attempt to correlate responses to requests for status with the retransmission of data packets for preventing unnecessary retransmissions. One proposed technique prevents a receiver from issuing a message signal requesting the retransmission of a data packet detected as incorrect until the receiver correctly receives a copy of a data packet which has a lower sequence number and has been previously detected as incorrect. This technique, however, does not provide favorable throughput efficiency.

Another selective rejection protocol technique, known as the CSRDLC protocol, described in detail in U.S. Pat. No. 4,439,859, incorporated by reference herein, utilizes the sequence numbers of data packets for correlating requests for retransmission with actual retransmissions and for determining whether retransmission of a data packet which is detected as incorrect is necessary. The CSRDLC approach, however, requires that data packets continue to be transmitted in sequence for effective correlation of requests, responses and retransmissions. As a result, after all data packets in a data file are originally transmitted, requests for retransmission can no longer be unambiguously correlated with the original transmissions for discerning which data packets have been retransmitted and, in turn, for avoiding unnecessary retransmissions.

SUMMARY OF THE INVENTION

The present invention is directed to methods and systems for efficiently transmitting a numbered sequence of data packets, comprising a data file, from one communication device to another by identifying incorrect data packets received at the receiving device, requesting a retransmission of each identified incorrect data packet from the transmitting device to the receiving device, and using cycle data for monitoring the successive progression of completed round trip message signal transmissions between the transmitting device and the receiving device for avoiding unnecessary retransmissions of data packets detected as incorrect during the transmission of sequentially numbered data packets of the data file. The cycle data are included in the data field of a message signal transmitted from a communication device to avoid unnecessary retransmissions when retransmitting data packets detected as incorrect using selective rejection protocol techniques.

In one aspect of the present invention, communication devices involved in a point-to-point communication connection (one device transmitting the data packets to a second device) store cycle data representative of the progression of successive completed round trips of message signal transmissions. A completed round trip of message signal transmissions constitutes a cycle and is defined as the transmission of a first message signal from a transmitting device which is received at a receiving device, and the transmission of a message signal, responsive to the first message signal, from the receiving device which is received at the transmitting device. The cycle data are preferably stored as single bit data values. These single bit data values are included in the data field of a message signal, which message signal is transmitted during the course of the point-to-point connection. The message signal is used for indicating the progression of cycles to the opposing communication device in the point-to-point connection. The cycle data are correlated with data stored in memory of the transmitting device that indicates which cycle a copy of a data packet was last transmitted. This is done in order to prevent retransmission of another copy of the data packet while the previously transmitted copy is in transit thereto.

In a further aspect of the present invention, unnecessary retransmissions during a multicast communication session (one device transmitting simultaneously the data packets to a plurality of receiving devices) are avoided by scheduling data packets requested for retransmission in accordance with a suitable compensating delay interval. The compensating delay interval is utilized, when necessary, for ensuring that the round trip propagation delay to the receiving communication device furthest from the transmitting communication device does not cause an unnecessary transmission of a data packet. Successive progression of completed round trips are monitored using cycle data comprising multiple data bits. The cycle data are represented using a corresponding number of data bits in the data field of a message signal transmitted during the communication session. The compensating delay interval introduced is a function of the number of bits used for representing the progression of cycles. Additional delay may be introduced to compensate for the propagation delay to the furthest receiver from the transmitter by utilizing a delay timer for delaying data packet retransmissions.

Further features and advantages of the present invention will become readily apparent to those of ordinary skill in the art by reference to the following detailed description and accompanying drawings.

DETAILED DESCRIPTION

Figure 1:
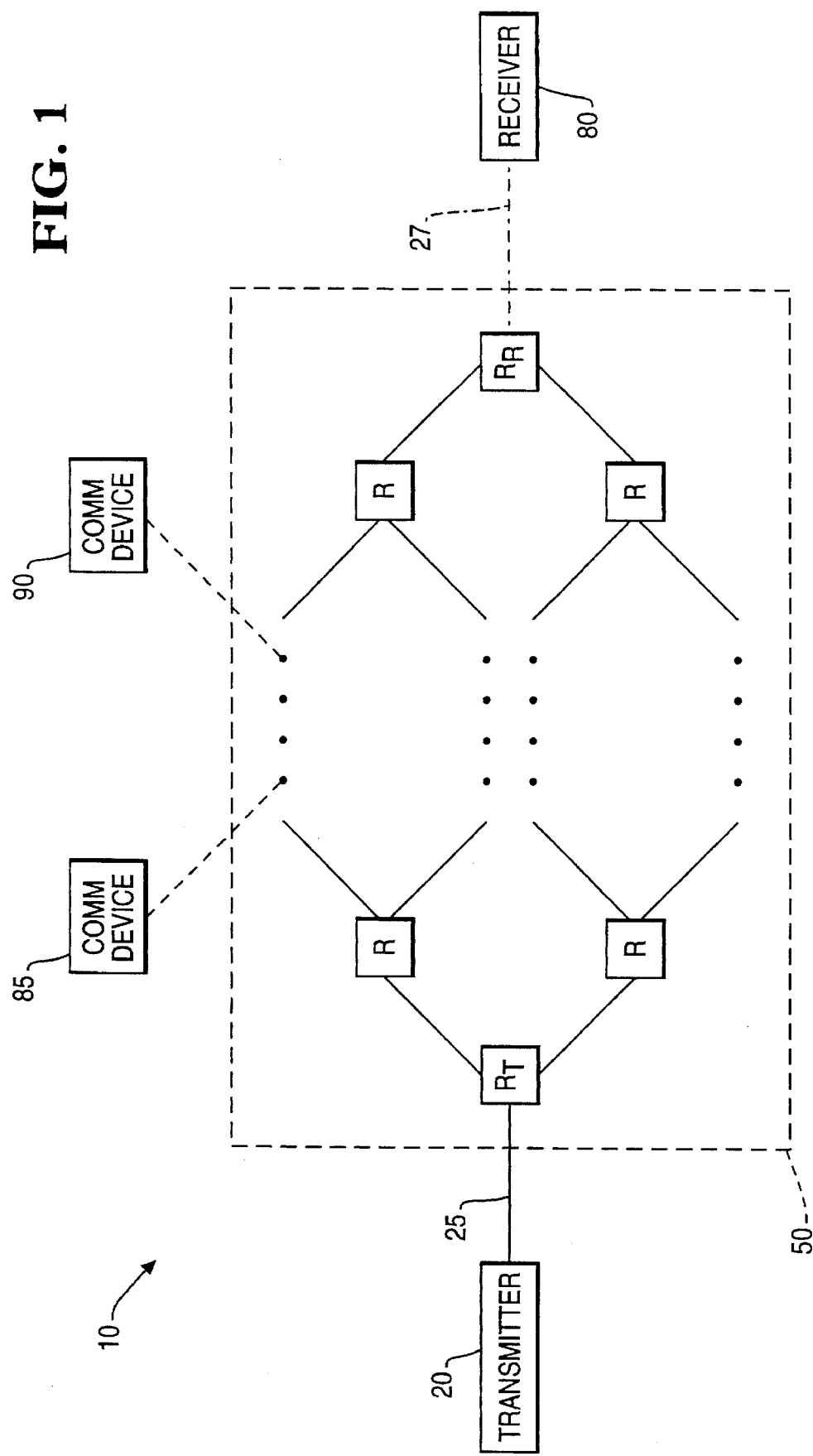
FIG. 1 shows in block diagram form an exemplary communication system which may be operated in accordance with the present invention for avoiding unnecessary retransmission of data packets when utilizing selective rejection protocol techniques.

FIG. 1 shows an exemplary communication system 10 which may suitably be operated in accordance with a transmission system protocol that utilizes selective rejection for retransmission of data packets and controls the retransmission of sequences of data packet for avoiding unnecessary retransmissions.

Referring to FIG. 1, the system 10 may suitably comprise a communication device 20 which may be connected to at least one communication device 80 via an interconnecting network 50 for establishing a point-to-point connection. It is to be understood that the system 10 may include additional communication devices, such as devices 85 and 90, which may be connected to the network 50 using well known techniques to facilitate, for example, a multicast communication session in which the devices 85 and 90 both attempt to receive a data file being transmitted by the device 20.

Figure 2:
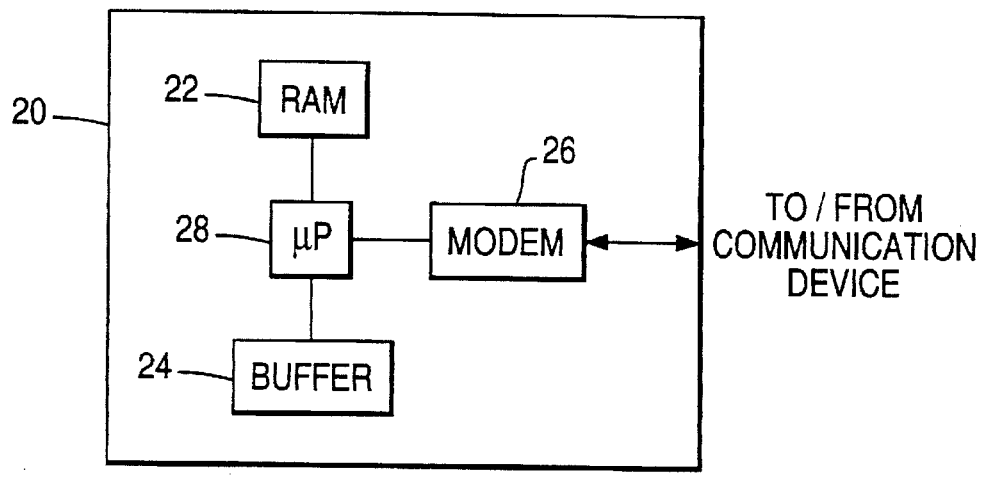
FIG. 2 illustrates an exemplary communication device in the system of FIG. 1 including functional blocks which may suitably perform operations associated with the present inventive technique of avoiding unnecessary retransmissions during a point-to-point connection.

FIG. 2 shows an exemplary embodiment of the device 20. As discussed below, the device 20 may suitably perform operations for avoiding unnecessary retransmissions during a point-to-point connection in the system 10. Referring to FIG. 2, the device 20 comprises individual functional blocks. The functions these blocks represent may be provided through the use of either shared or dedicated hardware, including but not limited to hardware capable of executing software. In a preferred embodiment, the functional blocks in the device 20 comprise a random access memory (RAM) 22, a BUFFER memory 24 and a modem 26, all of which are connected to a standard microcontroller or microprocessor 28. As explained below, the functional blocks provide for the processing of the contents of message signals received at the device 20 and the processing of data associated with implementation of the present inventive technique. The processor 28 conventionally stores processed data results in the RAM 22 and data packet information in the BUFFER 24. It is to be understood that the operations performed by the functional blocks and the processor 28 may be similarly performed using a single shared processor. Such a processor may comprise a standard digital signal processor and would include read only memory or other appropriate memory for storing software and performing the operations discussed below. Further, the present invention technique may be implemented using firmware or by discrete components implemented in an integrated circuit. Other suitable embodiments may be readily implemented by those of ordinary skill in the art.

Referring to FIG. 2, the modem 26 is suitably a standard component for receiving and transmitting data which may be included in the bits of a data field and as the contents of a message signal transmitted or received by the device 20. The BUFFER 24 is a conventional memory store for data packets which are either received or to be transferred during data file transfer. The RAM 22 is used for storing programmed instructions associated with the communication system protocols which control data file transmission operations. The processor 28 performs these instructions according to well known techniques. The RAM 22 may suitably include designated memory areas for storing data associated with performing operations set forth in the operating protocols. A communication device may suitably be any electronic device, such as, for example, a personal or laptop computer or a personal digital assistant, which includes electronic hardware, such as a modem, for transmitting and receiving electronic data signals over a communication network.

The network 50 suitably comprises a plurality of routers, R, which are interconnected to each other via land-line data links in accordance with standard techniques. The routers R are standard, well known components that may receive data signals from a communication device or router and then transmit these data signals to another router or communication device. It is to be understood that the network 50 may include wireless data links between the routers R, or there may be a combination of land-line and wireless data links which interconnect the routers R in the network 50.

At this point, the standard operating characteristics of the selective rejection protocol are described in order to provide a better understanding of the present inventive technique of controlling data packet retransmissions for avoiding unnecessary retransmissions using selective rejection techniques during transfer of a data file using sequentially numbered data packets. In selective rejection, a data file is separated into data packets (DP) which are sequentially numbered and transmitted originally from a transmitter in sequential order as individual message signals. For example, a data file may include one hundred data packets numbered DP 00, DP 01, ... DP 99 which are transmitted sequentially starting from DP 00.

At predetermined intervals during the sequential transmission of data packets, a transmitting communication device, or transmitter, issues a request for status (RQST) message signal. The RQST requires a communication device which is receiving the data file transmission, which is called the receiver, to respond with a message signal indicating data packets which, as of that time, have been detected as incorrect. An incorrect data packet is one that is unreadable as received or missing from the sequence of data packets being transmitted. For example, a RQST may be issued after the transmitter originally transmits data packets DP 00 and DP 01 or, alternatively, after the retransmission of a data packet requested for retransmission and the original transmission of a data packet in sequence.

A propagation delay associated with the distance a message signal travels between the transmitter and the receiver may affect the transmission of message signals between the former and latter that concern data packet retransmission. Consider, for example, a point-to-point connection involving a data file transfer occurring according to the above described exemplary conditions. The propagation delay may delay the reception of data packets and RQSTs at the receiver such that the receiver receives a first request for status $RQST_1$ at the same time that the transmitter is transmitting a message signal containing the data packet DP 40.

In response to a RQST, a receiver issues a status response (SRSP). The SRSP indicates those data packets, if any, that the receiver has detected as incorrect as of the time that the receiver received the RQST. The receiver also suitably indicates which RQST is being responded to in the data field of the SRSP message signal. This information implicitly acknowledges to the transmitter all data packets which have been correctly received at the receiver.

Selective rejection further provides that a receiver may issue a message signal known as an unsolicited status report (SRPT). The SRPT includes information indicating those data packets detected as incorrect that immediately precede a data packet which has been received correctly.

Upon receipt of an SRSP or SRPT message signal, the transmitter processes the contents of the message signal for determining whether data packet retransmission is requested. At the time that the transmitter first transmits another copy of a data packet, that data packet has experienced at least one round trip of propagation delay with respect to the receiver which requested the retransmission. Normally, the SRSP or SRPT message signals list data packets detected as incorrect in chronological order.

According to one aspect of the present invention, a selective rejection protocol is utilized for preventing unnecessary retransmissions during a point-to-point communication connection. As more fully discussed below, the two communication devices in a communication system involved in the point-to-point connection monitor the successive progression of completed round trips of message signal transmissions between the two devices for correlating multiple outstanding RQSTs and SRSPs or SRPTs with actual data packet retransmissions for avoiding unnecessary retransmissions. A completed round trip of message signal transmissions constitutes a cycle and is defined as the transmission of a first message signal from a transmitting device which is received at a receiving device, and the transmission of a message signal, responsive to the first message signal, from the receiving device which is received at the transmitting device.

In one embodiment, each communication device stores in its memory cycle data comprising a cycle value C and an acknowledgement value A. The cycle value C is representative of the progression of cycles. The acknowledgement value A is representative of the next expected value of the progression of cycles as monitored at the opposing communication device in the point-to-point connection. In a preferred embodiment, a new cycle begins immediately upon the completion of the previous cycle. The latest values of C and A at a communication device are each included as, preferably, a single bit in the data field of all RQST, SRSP, SRPT and data packet message signals issued from a communication device in connection with a point-to-point connection.

In addition, each communication device stores in its memory, at locations $C_{lat}$ and $A_{lat}$ using a commensurate number of data bits, the latest values of the C and A bits, respectively. These values are included in the data field of the received message signal issued by the opposing communication device in the point-to-point connection. In other words, the values of $C_{lat}$ and $A_{lat}$ at a communication device represent the values of C and A at the opposing device at the time a specific message signal, such as, for example, $RQST_1$, was transmitted.

The inclusion of the latest values of C and A in the data field of a data packet message signal updates the receiver of the point-to-point connection as to the progression of cycles in case RQSTs are lost in transit to the receiver. If a receiver does not issue a SRPT message signal, a transmitter need include the latest C and A values in the data field of only RQST message signals.

It is noted that the current values of C and A are suitably reported in the data field of each message signal, but no transmissions are initiated solely for the purpose of conveying this information. This provides an advantage of simplicity in implementing the present inventive technique in existing communication system protocols.

For purposes of illustration, the selective rejection protocol for a point-to-point communication connection is explained with reference to operations performed in the system 10 when data packets are detected as incorrect during the transfer of a data file from the device 20 to the device 80. The devices 20 and 80 are hereinafter referred to as the transmitter 20 and the receiver 80, respectively. It is to be understood, however, that a complementary data flow may exist for transfer of a data file from the receiver 80 to the transmitter 20.

Figure 3A:
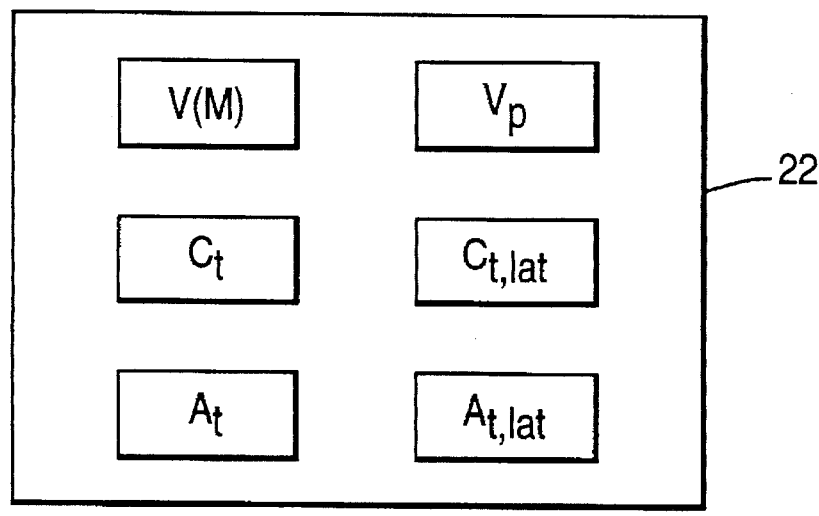
FIG. 3A illustrates the RAM of a communication device in the system of FIG. 1 which may be utilized for transmitting a data file and performing operations associated with the present inventive technique of avoiding unnecessary retransmissions during a point-to-point connection.
Figure 3B:
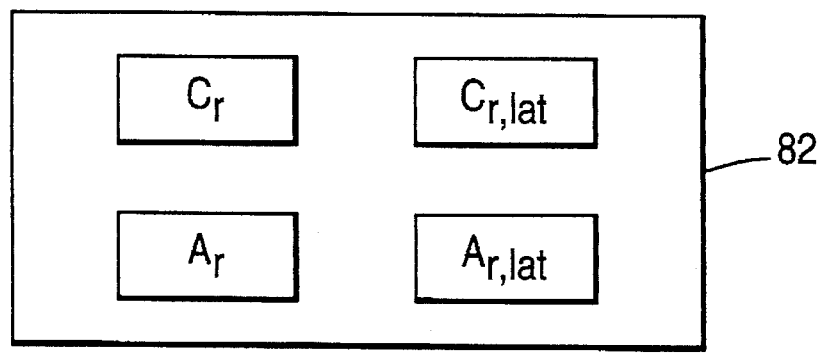
FIG. 3B illustrates the RAM of a communication device in the system of FIG. 1 which may be utilized for receiving a data file and performing operations associated with the present inventive technique of avoiding unnecessary retransmissions during a point-to-point connection.
Figure 4:
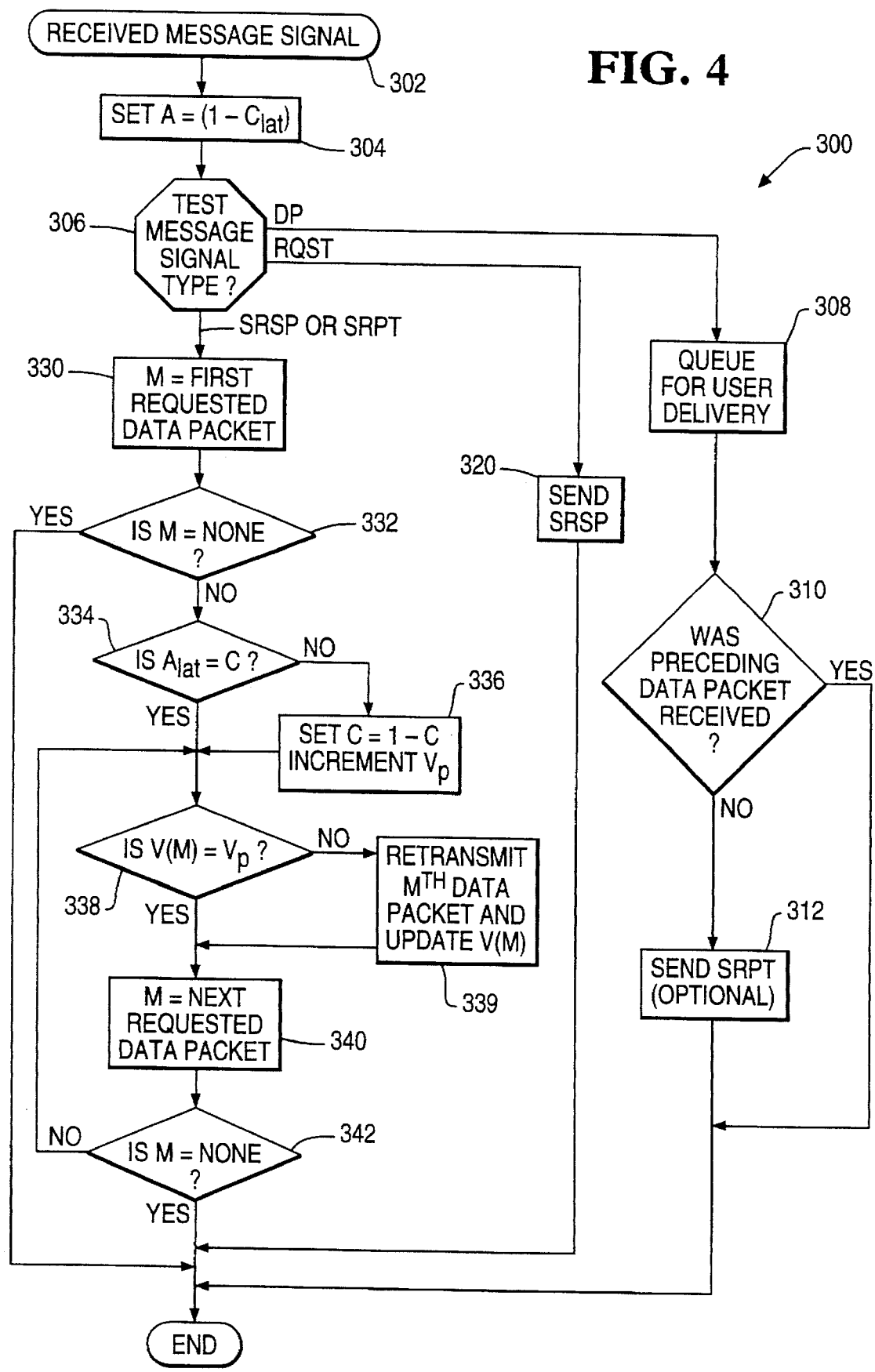
FIG. 4 is a generalized flow diagram of a method for avoiding unnecessary retransmissions during a point-to-point connection.

FIGS. 3A and 3B illustrate the utilization of memory areas in the RAMs 22 and 82 of the transmitter 20 and the receiver 80, respectively, for storing data values necessary for performing operations for avoiding unnecessary retransmissions in a point-to-point connection using the selective rejection protocol technique of the present invention. FIG. 4 shows an exemplary method 300 for controlling retransmission of data packets during a point-to-point connection in accordance with the selective rejection techniques of the present invention. As more fully discussed below, the method 300 is a generalized flow diagram illustrating operations which may be performed at a communication device acting as either a receiver or a transmitter in a point-to-point connection. For purposes of brevity and clarity, it is to be understood that reference hereinafter to data storage, retrieval and processing operations being performed by a communication device, such as the transmitter 20, is a shorthand reference to the performance of such operations by the processor in the communication device in accordance with programmed instructions in the RAM of the device.

Referring to FIG. 3A, the transmitter 20 stores in the RAM 22 at memory locations $C_t$ and $A_t$ data values representative of the progress of cycles C and the next expected value of cycle progression A at the receiver 80, respectively. In addition, the transmitter 20 stores data representative of the latest values of C and A which are included in the data field of the received message signal in memory locations $C_{t,lat}$ and $A_{t,lat}$, respectively, of the RAM 22.

Referring to FIG. 3B, the receiver 80 stores in the RAM 82 in memory locations $C_r$ and $A_r$ data values representative of the progress of cycles C and the next expected value of cycle progression A at the transmitter 20, respectively. In addition, the receiver 80 stores data representative of the latest values of C and A which are included in the data field of the received message signal in memory locations $C_{r,lat}$ and $A_{r,lat}$, respectively, of the RAM 82.

Referring to FIG. 3A, the RAM 22 further includes a memory location designated $V_p$ which is utilized as an internal counter for monitoring the progression of successive completed round trips of message signal transmissions between the transmitter 20 and the receiver 80. As more fully discussed below, for the point-to-point connection, $V_p$ is incremented each time that the value of $C_t$ at the transmitter 20 changes from "0" to "1" or "1" to "0".

The RAM 22 further includes memory locations for storing an array of values V(M). As discussed below in connection with the method 300, values of M are used for referring to any unacknowledged data packet. The Mth value of V(M) contains the value of $V_p$ at the time that the Mth data packet was last transmitted. In other words, the value of V(M) for an Mth data packet is updated whenever a copy of the Mth data packet is transmitted, such as, for example, during the retransmission of the Mth data packet in response to a request for retransmission. These operations provide that each unacknowledged data packet is correlated with the value of $V_p$ the last time a copy of that data packet was transmitted. If the correlated value equals the current value of $V_p$, the retransmission request is out of date and, therefore, ignored because the last retransmitted copy of the data packet was still in transit when the request was generated. In other words, the transmitter compares the value of V(M) of each unacknowledged data packet requested for retransmission with the current value of $V_p$ for determining whether that data packet has already been transmitted during the current cycle, thereby establishing whether a request for retransmission is based on out of date information and should be ignored.

The detection of cycle progression, therefore, is independent of the incremental progress of the original sequential transmission of data packets. This provides an important advantage in that once data packets are no longer originally transmitted because, for example, the transmitter does not have more data packets to transmit, correlation of retransmissions with requests remains precise, thereby avoiding unnecessary retransmissions of data packets detected as incorrect. The direct detection of cycles, thus, provides that data packets detected as incorrect may be received at a receiver without incurring unnecessary retransmission as long as communications between the receiver and transmitter do not completely break down.

For purposes of simplifying the explanation of the present invention, it is assumed that the retransmission of data packet message signals and the transmission of RQST, SRSP and SRPT message signals take priority over the original transmission of data packet message signals, and that the former occurs immediately when specified. Further, it is assumed that a copy of a data packet is initially originally transmitted when (i) a transmission opportunity exist, (ii) retransmission of data packets or transmission of control message signals are not awaiting transmission and (iii) all sequentially preceding data packets have been initially transmitted. Also, when a point-to-point connection is established for performing a data file transfer, all data values utilized in connection with the method 300 are initialized to zero. For example, at the transmitter 20, the values of $C_t$, $A_t$, $C_{t,lat}$, $A_{t,lat}$, $V_p$ and V(M), for all values of M, are initialized to zero. Similarly, at the receiver 80, the values of $C_r$, $A_r$, $C_{r,lat}$ and $A_{r,lat}$ are initialized to zero.

For purposes of highlighting the advantages of the present invention, it is assumed that the transmitter 20 is sequentially transmitting a data file containing DPs numbered DP 00, DP 01, ... DP 99; that RQSTs are issued after any two data packets are transmitted; that the propagation delay between the transmitter 20 and the receiver 80 causes the receiver 80 to receive the first message signal transmitted from the transmitter 20 at the time that the transmitter 20 is transmitting the fortieth successive message signal; and, that the receiver 80 will detect data packets DP 02 and DP 05 as incorrect.

Referring to FIG. 4, in step 302, a communication device in a point-to-point connection receives a message signal from the other communication device in the connection. The device then updates the values of $C_{lat}$ and $A_{lat}$ based on the C and A values included in the data field of the received message signal. In step 304, the device updates the internally stored value of A to 1-$C_{lat}$. In step 306, the device processes the message signal to identify the contents therein. A message signal may include a data packet, a RQST, a SRSP or a SRPT.

If the message signal includes a data packet, then steps 308 through 312 are performed. In this case, the device which received the message signal is acting as a receiver in the point-to-point connection and the data packet included in the message signal has been correctly received. In step 308, the receiver places the data packet included in the message signal on a queue which is established in the buffer of the device. The establishment of a queue in memory is a standard communication protocol technique for storing correctly received data packets. The queue is also used for determining whether data packets are missing from a data file transfer, such that they may be requested for retransmission. After all data packets of a data file are correctly received and placed in the queue, these data packets may be processed for reconstructing the transmitted data file for a user using standard application protocols.

In step 310, the receiver determines whether the queue includes the data packet preceding the currently received data packet. If yes, the receiver awaits the next message signal. If not, in step 312, the receiver may optionally issue a SRPT message signal requesting the retransmission of any preceding data packet which was detected as incorrect in step 310. For example, in the point-to-point connection between the transmitter 20 and the receiver 80, after the DP 03 is queued, the receiver 80 may transmit a SRPT requesting the retransmission of DP 02. The data field of the SRPT message signal issued by the receiver 80 would include the latest values of $C_r$ and $A_r$ at that time. After step 312, the receiver awaits the reception of the next message signal. As more fully discussed below, the transmission of the latest values of C and, especially, A, from a receiver to the opposing communication device, or transmitter, where the value of A has changed due to the operations performed in step 304, implements the present invention of avoiding unnecessary retransmissions of data packets.

If in step 306 the communication device determines that the message signal includes a RQST, then the device is also acting as a receiver. In this case, the receiver performs step 320. In step 320, the receiver issues a SRSP message signal in response to the currently received RQST. The SRSP indicates which data packets are incorrect, based on the data stored in the queue. The data field of the SRSP message signal includes the latest values of A and C at the receiver.

In the exemplary point-to-point connection, the receiver 80 would issue a SRSP in response to a RQST message signal. The SRSP message signal would include a request for the retransmission of any data packets detected as incorrect, and the data field associated with the SRSP message signal would include the latest values of $C_r$ and $A_r$. It is noted that the value of $A_r$ may change at step 304 due to the reception of the RQST message signal being processed. For example, the value of $A_r$ would be incremented from "0" to "1" when the receiver 80 receives the $RQST_1$ from the transmitter 20 as, at step 300, $C_{r,lat}$ and $A_{r,lat}$ would both equal "0" based on the data included in the data field of $RQST_1$. At step 320, the receiver 80 would transmit a message signal $SRSP_1$ that does not include any requests for retransmission and include the latest values of $A_r$ and $C_r$ in the data field associated with the $SRSP_1$ message signal. When the transmitter 20 would receive the message signal $SRSP_1$, $C_{t,lat}$ and $A_{t,lat}$ would be set equal to "0" and "1", respectively, at step 302. Similarly, when the transmitter 20 would receive the message signal $SRSP_2$, $C_{t,lat}$ and $A_{t,lat}$ would also be set equal to "0" and "1", respectively, at step 302. For the $SRSP_2$ received message signal, after step 304 is performed, the values of $C_r$ and $A_r$ would still equal "0" and "1", respectively. At this point, the transmitter 20 would not have completely processed a message signal issued by the receiver 80 requesting the retransmission of a data packet.

When a communication device receives a message signal comprising a SRSP or SRPT, then steps 330 through 342 of the method 300 are performed. In this circumstance, the device is acting as a transmitter in a point-to-point connection. In step 330, the transmitter processes the contents of the received message signal SRSP or SRPT for determining whether any data packet has been requested for retransmission. The transmitter sets a variable M, which may be suitably stored in the RAM of the device, equal to the lowest sequence number of an unacknowledged data packet which is listed in the contents of the SRSP or SRPT message signal as part of a request for retransmission. If the SRSP or SRPT message signal does not list any data packets for retransmission, M is set equal to a data value called NONE for representing this condition. For example, when the transmitter 20 receives the $SRSP_2$ message signal, a request for retransmission of DP 02 would have been the only request for retransmission. Therefore, in step 330, the transmitter 20 would set the variable M equal to "2".

In step 332, the transmitter determines whether M is equal to NONE. If yes, the transmitter awaits the next message signal at step 302, as no retransmissions are indicated in the current message signal. If M is not equal to NONE, in step 334, the transmitter determines whether $A_{lat}$ is equal to C. If this condition is not true, in step 336, the transmitter toggles its internal value of C, in other words, C is set equal to C−1. Further in step 336, the transmitter increments the value of $V_p$ by one. Alternatively, if the condition in step 334 is true, then the cycle corresponding to a previously performed data packet retransmission has not been completed. As discussed below, the determination at step 334 is utilized for avoiding an unnecessary retransmission of a data packet for which a copy was already retransmitted when the currently received request for retransmission is out-of-date. In other words, the currently received request issued while the last transmitted copy of the data packet was in transit to the receiver. Step 338 is performed after step 334 or step 336.

In step 338, the transmitter determines whether the current value of $V_p$ is equal to the value of V(M). Comparison of V(M) to the current $V_p$ value determines whether any particular data packet has already been transmitted in the current cycle, thereby establishing whether a request for retransmission is based on out-of-date information. If V(M) is not equal to $V_p$, in step 339, the transmitter retransmits a copy of the unacknowledged data packet whose sequence number corresponds to the current value of M. Further in step 339, the transmitter updates the Mth value of V(M) with the current value of $V_p$. Step 340 is performed after step 338 or 339.

In step 340, the transmitter analyzes the contents of the message signal for determining whether another request for retransmission of a data packet is present. If such a request exists, the value of M is set equal to the sequence number corresponding to the next requested data packet. Otherwise, M is set equal to NONE as in step 330. M may be set equal to NONE at step 340, for example, if several data packets were requested for retransmission, and all of the these requests have been processed by the performance of step 338 to step 339.

In step 342, the transmitter determines whether M is equal to NONE as in step 332 above. If no, step 338 is repeated and the next data packet requested for retransmission is evaluated, based on the current value of $V_p$, for determining whether a copy of the data packet has already been retransmitted and is in transit during the current cycle. Otherwise, the transmitter awaits the reception of another message signal.

Continuing to describe the data file transfer for the exemplary point-to-point connection, for the message signal $SRSP_2$, the transmitter 20 would perform step 336 and increment $C_t$ and $V_p$. Then, at step 338, M would equal "2" and V(2) would equal the initialized value of "0", because a copy of the data packet DP 02 would not have been retransmitted. As $V_p$ would equal "1", the transmitter 20 would perform step 339 and retransmit a copy of DP 02 and update the value of V(2) to "1". Subsequent requests for retransmission of DP 02 after the first copy is retransmitted and before the completion of the corresponding cycle would be ignored because they are out-of-date with respect to the retransmission of DP 02, as DP 02 would be in transit when such requests were issued. Step 338 would therefore prevent the retransmission of another copy of the data packet DP 02 until the transmitter 20 receives a SRSP in response to the RQST issued after DP 02 was retransmitted, thereby changing the value of $A_{r,lat}$ and permitting $C_t$ to be incremented at step 336.

Continuing to highlight the exemplary point-to-point connection, assume that the receiver 80 would transmit the message signal $SRSP_3$ in response to the $RQST_3$ transmitted by the transmitter 20. The $SRSP_3$ would include a request for the retransmission of DP 02 and DP 05, and the latest values of $C_r$ and $A_r$ would be represented in the data field of the message signal as "0" and "1", respectively. Both DP 02 and 05 would be requested at this time because the propagation delay between the receiver 80 and the transmitter 20 would provide that the retransmitted copy of DP 02 would be in transit and not arrive at the receiver 80 before the $SRSP_3$ message signal would be issued. At the time that the $SRSP_3$ would be issued, $SRSP_1$ and $SRSP_2$ also would not have been received at the transmitter 20, so $C_t$ and $A_r$ would still equal "0". As explained above, processing of $SRSP_2$ would increment $C_t$. Therefore, when the message signal $SRSP_3$ would be received at the transmitter 20, at step 330, the values of $A_r$, $C_t$ and $A_{t,lat}$ would equal "1", $C_{t,lat}$ would equal "0" and M would equal "2". At step 334, the transmitter 20 would determine that $A_{r,lat}$ and $C_t$ are equal, in other words, that a cycle corresponding to the previous data packet transmission, namely DP 02, has not been completed. Therefore, at step 338, based on the value of V(2) and $V_p$, both of which would equal "1", the unnecessary retransmission of DP 02 would be avoided. The transmitter 20 would then perform steps 340 and 342 and then step 338 to determine whether the next requested data packet for retransmission, namely DP 05, should be retransmitted.

For DP 05, the transmitter 20 would proceed from step 334 to step 338, as above, where the transmitter 20 would determine that V(5), which would equal "0", is not equal to $V_p$, which would equal "1" at that time. Therefore, the transmitter 20 would perform step 339 for retransmitting a copy of DP 05 and for updating the value of V(5) with the latest value of $V_p$ for correlating the retransmission of a copy of DP 05 with a cycle. As a result, the transmitter 20 would retransmit a copy of only DP 05 in response to the $SRSP_3$ message signal, because the request for retransmission of DP 02 in $SRSP_3$ would be based on out-of-date information. In other words, another copy of the data packet DP 02 would still be in transit when the receiver 80 issued the second request for retransmission of that data packet.

In short, when the transmitter 20 increments $C_t$ and includes this information in a RQST which is then received at the receiver 80, the receiver 80 then toggles the value of $A_r$ and sends this latest toggled value of $A_r$ back to the transmitter 20 in a SRSP for acknowledging the completion of a round trip of message signal transmissions between the transmitter 20 and the receiver 80. When a SRSP is received at the transmitter 20 where the latest value of A stored in the data field of the message signal is a toggled value based on the reception of the corresponding RQST at the receiver 80, then a cycle corresponding to a retransmission has been successfully completed.

In a further aspect of the present invention, the retransmission of data packets using the selective rejection protocol is controlled for avoiding unnecessary retransmissions during a multicast communication session. Requests for status issued by a multicast transmitter and responses requesting retransmission issued by receivers which are attempting to receive a data file being transmitted by the multicast transmitter are correlated with data packet retransmissions for avoiding the unnecessary retransmission of a data packet by delaying the retransmission of data packets requested for retransmission until a time when a round trip of message signal transmissions between the transmitter and the receiver furthest from the transmitter should have been competed.

The present invention provides advantages over prior art selective rejection protocols which do not have the capability for compensating for the propagation delay difference among multiple receivers and the transmitter in a multicast communication session. In particular, the present inventive technique ensures that the longest round trip propagation delay, defined in terms of the distance a message signal must travel from the transmitter to the furthest receiver and vice versa, is suitably compensated to avoid unnecessary retransmissions during the multicast session.

For example, in a multicast communication session comprising first and second receivers, an out-of-date message signal may occur when the second receiver, which is a further distance (time) away from the transmitter than the first receiver, issues a request for retransmission of a data packet after a copy of that data packet has been retransmitted pursuant to a request by the first receiver. The retransmission of the data packet in response to the request of the second receiver would result in an unnecessary retransmission of a copy of the data packet because the data packet would be presently in transit and may ultimately be received by the second receiver, thereby obviating the necessity for retransmission of another copy of the data packet.

For purposes of illustration, multicast transmission in accordance with the present inventive technique is described with reference to transmission of a data file within the system 10 shown in FIG. 1 from a communication device, such as the transmitter 20, to multiple communication devices which are initialized for receiving the data file, such as the communications devices receivers, namely 80 and 85. The receiver 85 is assumed to be the receiver which is closest in distance to the transmitter 20, hereinafter referred to as REC-C, and the receiver 80 is assumed to be the receiver which is furthest in distance from the transmitter 20, hereinafter referred as REC-F. It is to be understood that a multicast session may include more than two receivers and still operate in accordance with the present inventive protocol for avoiding unnecessary retransmissions. Reference to data values which are used in processing and are stored in the RAM of a communication device for performing the present inventive technique during a multicast session are identified below using identical designations utilized in the point-to-point connection method 300 above when reference is being made to similar data information.

The present inventive technique, implemented for a multicast session, requires the introduction of a compensating delay interval in the scheduling of the retransmission of data packets. This compensating delay interval is utilized to compensate for a propagation delay difference, if any, between the receiver which is furthest from the transmitter and receivers which are closer to the transmitter and, therefore, avoid unnecessary retransmissions during a multicast session.

The compensating delay interval adds a delay before the retransmission of data packets requested for retransmission in response message signals. The compensating delay interval may be implemented by (i) increasing the number of bits assigned to the values of C and A from one, as utilized in the point-to-point connection, to more than one, and preferably two; and, in addition, (ii) through the use of a delay timer to introduce further delay before the retransmission of data packets which are requested to be retransmitted in SRSPs or SRPTs.

The value C is stored at the multicast transmitter and utilized for monitoring progress of successive completed round trips of message signal transmissions between the transmitter and any of the multicast receivers. C is incremented each time a sequence of data packets is retransmitted. The value of A is stored internally at each receiver involved in a multicast session, and is utilized for acknowledging any received cycle C indication in accordance with the techniques describe below.

In the preferred embodiment, the values of C and A are each represented by two bits in a data field of a message signal due to standard communication protocol system limitations. For example, in one communication session scenario, when C is allocated two bits in the data field of message signals, the propagation delay difference between REC-F and REC-C would be suitably compensated such that the time interval for at least one round trip of message signal transmissions between the transmitter 20 and REC-F would be less than the delay introduced by incrementing C four times.

If the compensating delay interval is too small, such that a round trip would not necessarily have been completed by the time that the transmitter 20 increments C for a fourth time, in other words, the value of C wraps around to zero, the transmitter 20 then could not determine if the request is out-of-date for avoiding an unnecessary retransmission. For example, when a data packet is retransmitted for a second time and C is incremented a fourth time based on a request by REC-C, that data packet may equivalently have been the subject of a request for retransmission issued by REC-F, where the compensating delay interval implemented by C for delaying the retransmission of data packets scheduled for retransmissions was insufficient to compensate for the propagation delay difference between REC-C and REC-F. In this case, the transmitter 20 would increment C too quickly so that the transmitter 20 could not determine whether REC-C did not receive the first retransmitted copy of the data packet or REC-F was requesting the retransmission of the data packet based on detection of the previously transmitted data packet as incorrect.

As more fully discussed below, the multicast protocol of the present invention overcomes the problem of propagation delay to the furthest receiver in a communication session by implementing a suitable compensating delay interval as part of the processing steps for delaying the retransmission of data packets requested and scheduled for retransmission until the time when a round trip of message signal transmissions between the transmitter and the furthest receiver should have been completed. The compensating delay interval is predetermined by a user.

Figure 5:
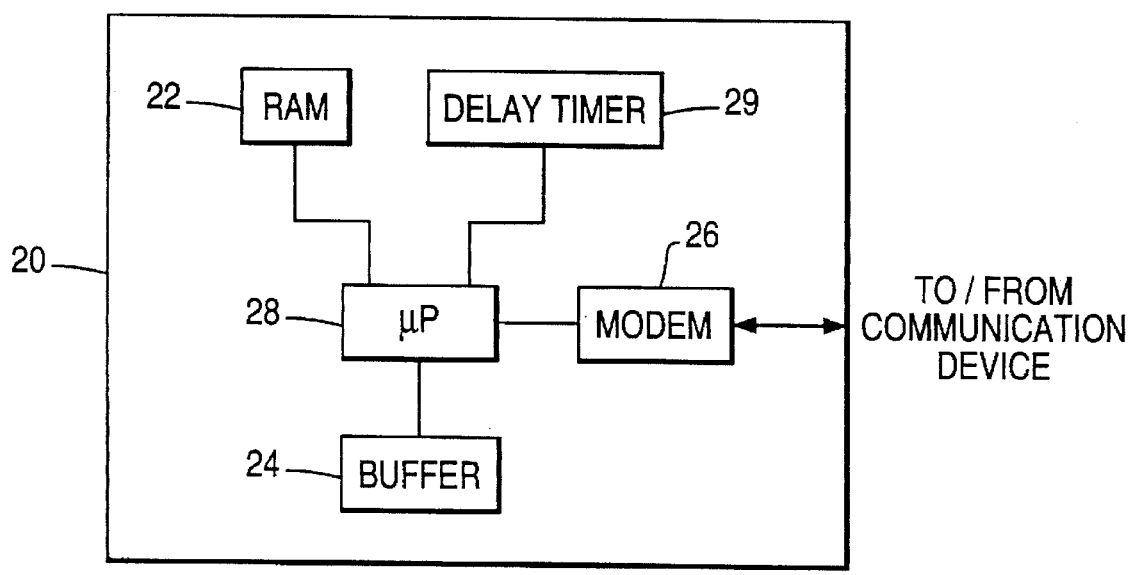
FIG. 5 illustrates an exemplary communication device in the system of FIG. 1 which may be utilized for transmitting a data file and performing operations associated with the present inventive technique of avoiding unnecessary retransmissions during a multicast communication session.

FIG. 5 shows an exemplary embodiment of the transmitter 20 which may perform operations for avoiding unnecessary retransmissions during the multicast transfer of a data file to the receivers REC-C and REC-F in the system 10. The transmitter 20 is similar, and preferably identical, in structure and operation to the device 20 shown in FIG. 2, and further includes a functional block of a delay timer 29 connected to the processor 28. The delay timer 29 comprises a standard timing device, such as a clock, which may time a predetermined timer delay interval and then provide control signals to the processor 20 indicating time-out of the timer delay interval being timed. The timing of the timer delay interval at the delay timer 29 may be restarted at any time by suitable control signals provided from the processor 28. A further description of the operation of the delay timer 29 for avoiding unnecessary retransmissions is provided below.

As more fully discussed below in connection with FIGS. 6A, 6B and 6C, in one preferred embodiment, a compensating delay interval is introduced for delaying data packet retransmission so that at least one round trip of message signal transmissions between the transmitter and the furthest receiver should be completed during the time that the value of C increments from 0 to RANGE −1. The value selected for RANGE is a function of the amount of propagation delay difference which may be accommodated by the number of bits allocated for representing the value of C in a data field of a message signal. In other words, the value of RANGE represents the number of values which may be distinctly represented by the number of bits utilized for representing C in a data field. Theoretically, any number of bits may be allocated in a data field for representing C or A. Standard communication protocols, however, have a limited number of bits available that may be included in a data field of a message signal. Selection of a larger value for RANGE allows that a longer propagation delay difference may be accommodated without using a delay timer for adding additional delay. A delay timer, thus, may be utilized for adding additional delay before retransmission of data packets is performed to further compensate, if necessary, for the propagation delay difference.

For an exemplary multicast communication session, the transmitter 20 stores the internal value of C in memory locations $C_t$ in the RAM 22, and initially sets $C_t$ equal to "0" when a connection setup is established. Further, the receivers REC-C and REC-F store their interval values of A at memory locations $A_{rec-c}$ and $A_{rec-f}$, respectively, in their respective RAMs and initialize these values to "0" when a connection is setup. As for the point-to-point connection above, the transmitter 20 includes memory areas in the RAM 22 for storing the latest value of A which is included in the data field of a received message signal, and for storing the current values of $V_p$, M and V(M). Further, memory locations in the BUFFER 24 are allocated such that a flag bit RETM may be associated with each data packet for indicating whether the data packet is scheduled for retransmission. For example, setting the RETM bit high for a data packet would indicate that a retransmission is scheduled, whereas a low value for RETM would indicate retransmission of the data packet is not scheduled. As explained below, the flag bit RETM for a data packet is cleared when a copy of the data packet is retransmitted.

For purposes of illustration, it is assumed that allocating two bits in the data field for representing C and A values provides sufficient compensation for the propagation delay difference between REC-C and REC-F with respect to the transmitter 20. As C comprises two bits in a data field, RANGE is set equal to 4 for avoiding unnecessary retransmissions. In a preferred embodiment, the latest value of A is included in the data field of the message signal transmissions of SRSP or SRPT from a receiver, and the latest value of C is included in the data field of data packet and RQST message signal transmissions from the transmitter to the multicast receivers. For purposes of clarity, it is assumed that the use of a delay timer is not necessary as the number of bits in the data field allocated for representing the latest values of C and A is sufficient for compensating for the propagation delay difference. An explanation of how much delay should be added to compensate for the propagation delay difference when utilizing the delay timer is provided below.

Figure 6A:
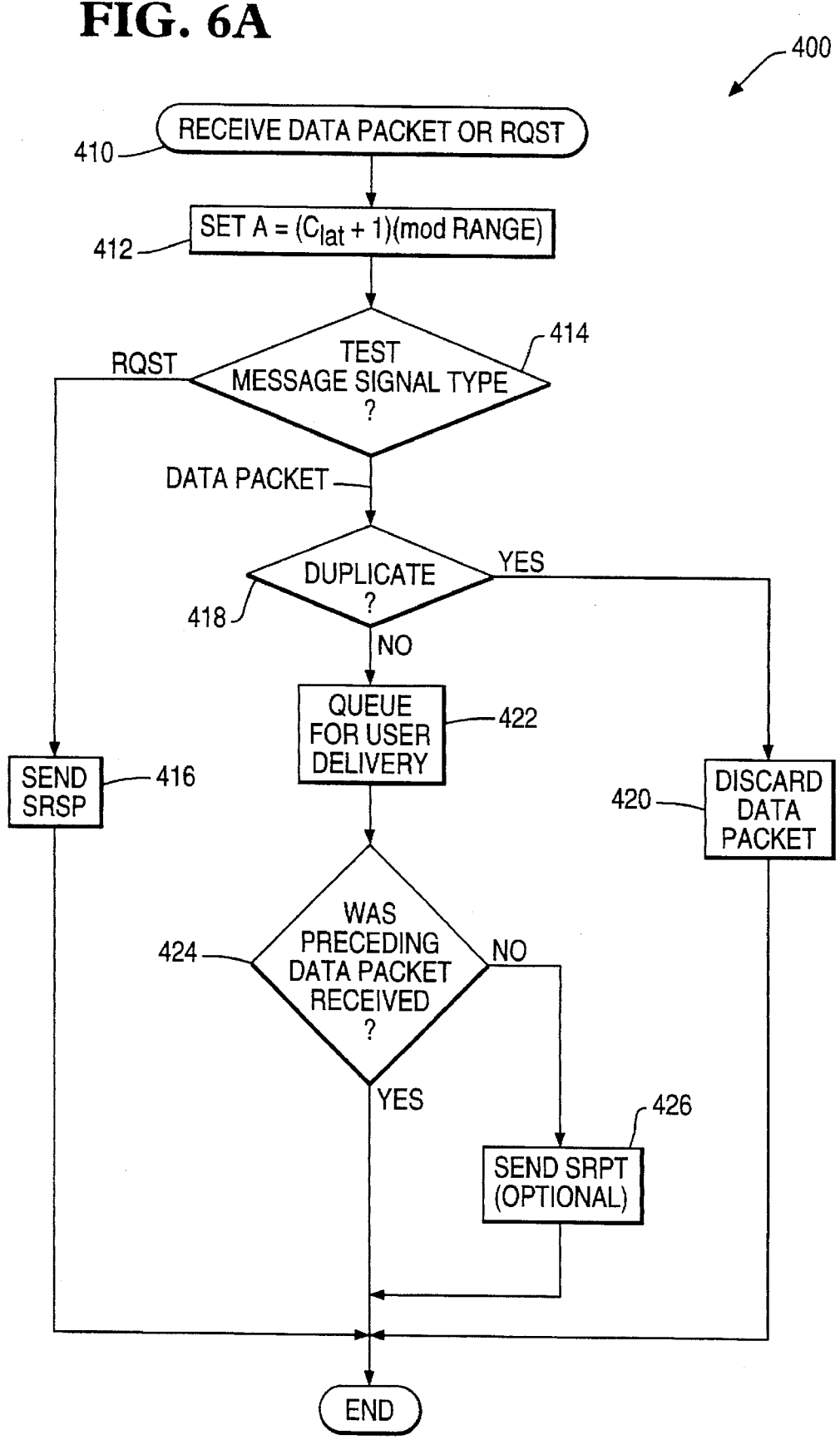
FIG. 6A is a flow diagram of a method for processing the contents of message signals received at a multicast receiver for avoiding unnecessary retransmissions in accordance with the present invention.

FIG. 6A shows a method 400 for processing message signals at a multicast receiver, such as REC-C or REC-F, for avoiding unnecessary retransmissions during a multicast communication session. In step 410, the receiver detects a message signal which includes either a data packet or a RQST and includes two bits in the data field for representing the latest value of $C_t$ at the transmitter 20. Further in step 410, the receiver updates the value of $C_{lat}$ in its RAM based on the values included in the data field of the received message signal. In step 412, the receiver sets the value of A in its RAM equal to $(C_{lat}+1)(\text{mod RANGE})$. In step 414, the receiver determines whether the message signal included a data packet or a RQST. If a RQST was included, in step 416, the receiver issues a SRSP message signal. A SRSP is issued in the multicast protocol in the same manner as explained above for the point-to-point connection protocol at step 320 of the method 300, except that the receiver includes the latest value of only A in the data field using the allocated number of bits. The receiver then awaits the reception of another message signal for the multicast communication session.

If the message signal received at step 410 includes a data packet, steps 418 through 426 are performed. In step 418, the receiver determines whether the copy of the data packet in the received message signal is a duplicate of a data packet already received and stored in the buffer. For example, a duplicate data packet may be received at REC-C if the transmitter 20 retransmitted a copy of the data packet based on a request for retransmission issued by REC-F where REC-C had correctly received the originally transmitted copy of the data packet. When a receiver identifies a data packet as a duplicate, in step 420, the receiver discards the data packet contents of the received message signal and then awaits the next message signal. If the data packet is not a duplicate, the receiver performs steps 422, 424 and 426 in the same manner as steps 308, 310 and 312 of the method 300, respectively, for placing the data packet on a queue and transmitting an optional SRPT after determining whether the preceding data packet was received correctly.

For the exemplary multicast transmission, the value of A at the receiver REC-C or REC-F would remain equal to "1" until a RQST or data packet message signal is received and the transmitter 20 transmitted that message signal after the transmitter 20 processed a request for retransmission and then retransmitted a copy of a data packet. As further explained below, the value of $C_t$ at the transmitter 20 is incremented only when a sequence of data packets is retransmitted.

Figure 6B:
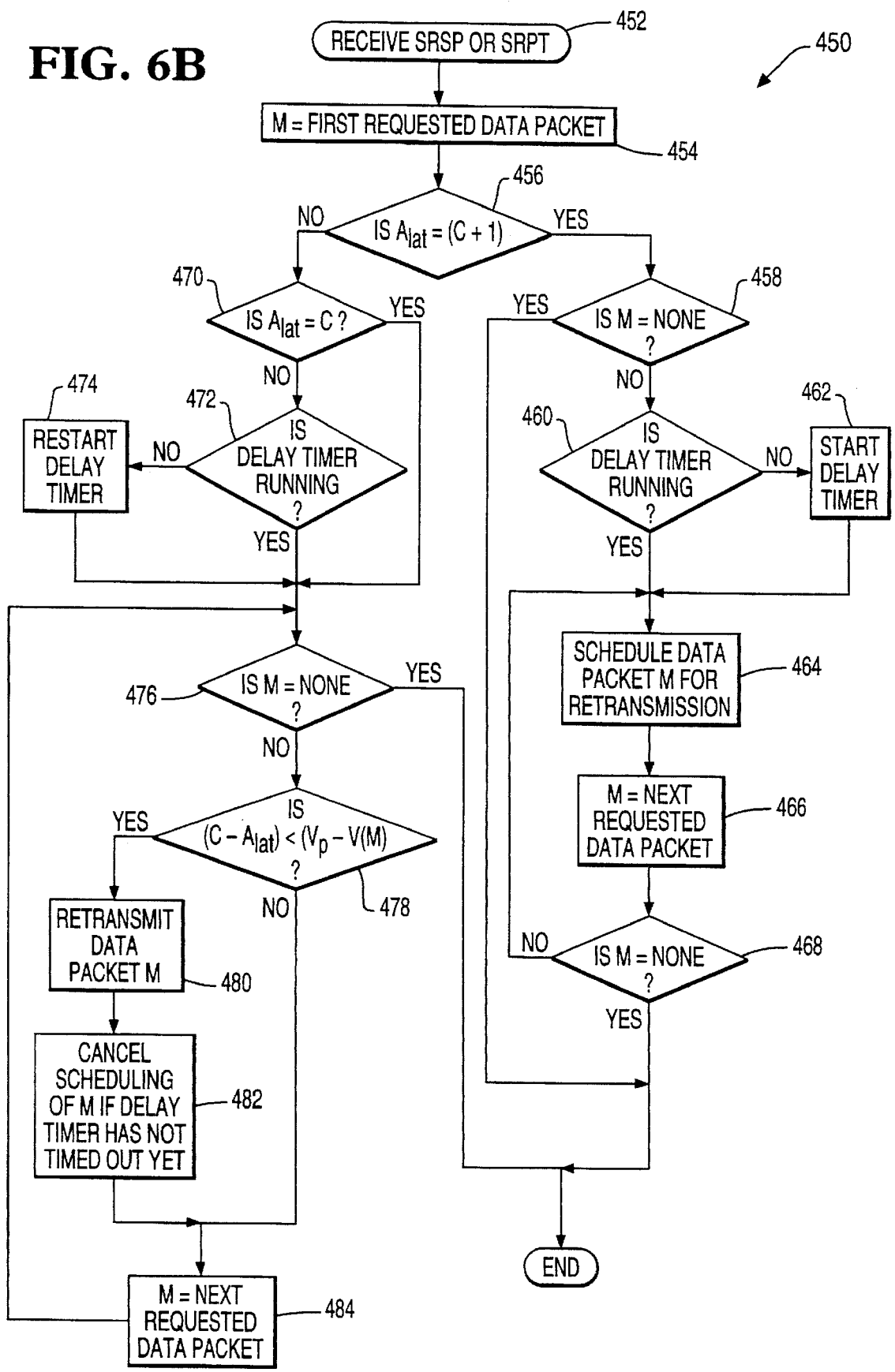
FIG. 6B is a flow diagram of a method for processing the contents of message signals received at a multicast transmitter for avoiding unnecessary retransmissions in accordance with the present invention.

FIG. 6B shows a method 450 for processing message signals received at the transmitter 20 for avoiding unnecessary retransmissions of data packets in connection with a multicast communication session. In step 452, the transmitter 20 detects the reception of either a SRSP or SRPT message signal. The data field in these message signals includes bits representing the latest value of A at the receiver which issued the message signal. As for the point-to-point connection protocol described above, the transmitter 20 stores in its RAM 22 at $A_{t,lat}$ the latest value of A included in the data field. In step 454, the transmitter 20 processes the received message signal as in step 330 of the method 300 for determining the sequence number of a data packet, if any, which is requested for retransmission. Then, in step 456, the transmitter 20 determines whether $A_{t,lat}$ is equal to $C_t+1$.

If the condition in step 456 is true, the transmitter 20 performs steps 458 through 468 for scheduling the retransmission of data packets. In step 458, the transmitter 20 determines whether the value of M is equal to NONE, as in step 332 of the method 300. If yes, the transmitter 20 awaits the next message signal as requests for retransmission have not been indicated in the received message signal. If no, in step 460, the transmitter 20 determines whether the delay timer 29 is timing a timer delay interval. If the delay timer 29 is not timing, in step 462, the transmitter 20 generates control signals to start the timing of a timer delay interval by the delay timer 29. Step 464 is then performed after step 460 or 462.

In step 464, the transmitter 20 schedules the retransmission of a copy of the data packet having the sequence number M by setting to high the flag bit RETM associated with the unacknowledged data packet. After the requested data packet is scheduled for retransmission in step 464, in step 466, the transmitter 20 determines, in the same manner as in step 340 of the method 300, whether the SRSP or SRPT message signal includes other requests for data packet retransmission. In step 468, the transmitter 20 determines whether M is equal to NONE as in step 458. If yes, the transmitter 20 awaits the reception of a message signal from either the receiver REC-C or REC-F. Otherwise, the transmitter 20 continues to perform steps 464 through 468 for scheduling additional data packets for retransmission.

Figure 6C:
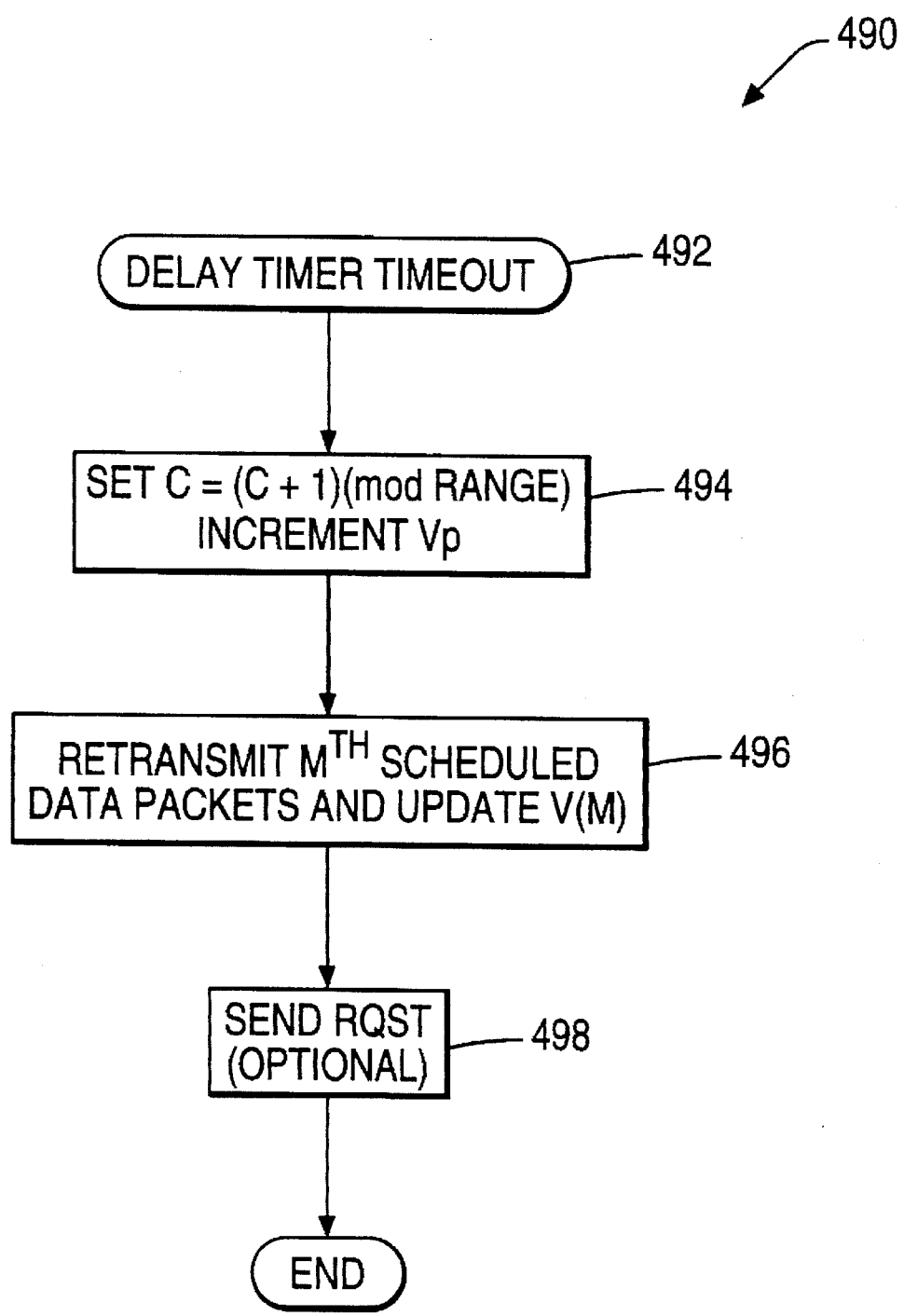
FIG. 6C is a flow diagram of a method for retransmitting a sequence of data packets in accordance with the present inventive technique of avoiding unnecessary retransmissions during a multicast communication session.

In the case where M is equal to NONE at step 468 and the delay timer 29 is set to a zero second timer delay interval, in other words, the delay timer 29 is not used for compensating for propagation delay difference, the transmitter 20 performs the steps of a method 490, shown in FIG. 6C, for retransmitting data packets scheduled for retransmission. Alternatively, the transmitter 20 would perform the method 490 for retransmitting any data packets scheduled for retransmission once the delay timer 29 has experienced a time-out and M is equal to NONE at step 468. It is to be understood that the transmitter 20 performs the process 490 while suitably continuing processing related to the performance of the steps of the method 450.

Referring to FIG. 6C, in step 492, the processor 28 of the transmitter 20 detects control signals which are suitably provided by the delay timer 29 for indicating a delay time-out, in other words, that the timer delay interval being timed has elapsed. When a time-out occurs or the timer delay interval is set equal to zero, in step 494, the transmitter 20 updates the value of $C_t$ to $(C_t+1)(\text{modRANGE})$ and increments $V_p$ by one. $C_t$ is incremented at this point for tracking the cycle corresponding to a sequence of data packet retransmissions.

In step 496, the transmitter 20 retransmits a copy of the data packets scheduled for retransmission as message signals. Further, the transmitter 20 updates the Mth values of V(M) with the current value of $V_p$, where the values of M correspond to the sequence numbers of the data packets which were scheduled for retransmission. In step 498, the transmitter 20 may issue an optional RQST. Alternatively, RQSTs may be issued in accordance with the predetermined interval.

Referring to FIG. 6B once again, if the condition in step 456 is not true, then in step 470 the transmitter 20 determines whether $A_{t,lat}$ is equal to $C_t$. If $A_{t,lat}$ is not equal to $C_t$, then in step 472 the transmitter 20 determines whether the delay timer 29 is timing. If the timer 29 is timing, then in step 474, the transmitter 20 restarts the timing of the timer delay interval by the delay timer 29. The transmitter 20 restarts the timing of a timer delay interval at this step in order to obtain an additional delay of at least a full timer delay interval from the time the transmitter 20 received the current message signal. This additional delay is introduced because the conditions of step 456 and 470 have not been satisfied. In other words, the values in the data field of the message signal which the transmitter 20 received indicate that the propagation delay difference has not been compensated, thereby preventing round trip message signal transmission to REC-F from maintaining pace with the incremental progression of $C_t$. In this situation, the counter $C_t$ has been incremented too fast for adequately compensating for the propagation delay difference between REC-C and REC-F with respect to the transmitter 20. This phenomenon may occur if some of the originally transmitted or retransmitted data packet or RQST message signals never arrive at the receiver REC-F or because the timer delay interval selected for the delay timer 29 was set too small to compensate for the propagation delay difference in combination with the implemented compensation delay interval. Restarting the delay timer 29 adds delay to compensate for these possible events. For example, REC-F may have yet to receive message signals and issue responsive message signals which have been received by the transmitter 20 while the transmitter 20 otherwise was incrementing $C_t$ based on the requests for retransmission by REC-C. Stated otherwise, the internal value of A at REC-F would be too far behind the progression of $C_t$ at the transmitter 20. Therefore, the delay timer 29 would be restarted for delaying the incremental progression of $C_t$ at the transmitter 20. Step 476 is performed after steps 472 or 474, or if the condition in step 470 is true.

In step 476, the transmitter 20 determines whether the value of M is equal to NONE as in step 458. If yes, then the message signal SRSP or SRPT did not include a request for retransmission, and the transmitter 20 awaits the next message signal. If M is equal to a value other than NONE, in step 478, the transmitter 20 determines from the inequality $C_t - A_{t,lat} < V_p - V(M)$ whether the data packet requested in the currently received message signal was retransmitted so recently that the receiver which issued this message signal would not have known that a copy of the data packet would already be in transit at the time this responsive message signal was being issued. The propagation delay difference associated with the distance for signal travel between the transmitter 20 and REC-F may cause this event to occur. If the inequality in step 478 is true, then the Mth data packet which has been requested in the received message signal has not been retransmitted so recently that the retransmission of a copy at this time would not represent an unnecessary retransmission. It is possible, however, that this data packet was scheduled for retransmission where a delay timer 29 is utilized. Step 480 is performed if the inequality in step 478 is true.

In step 480, the transmitter 20 retransmits a copy of the data packet having a sequence number equal to M, and also cancels scheduling of the retransmission of the Mth data packet, if so scheduled, by clearing the associated RETM bit if the delay timer 29 is running and the timer delay interval has not timed out. After step 478 or step 482, the transmitter 20 performs step 484 in the same manner as step 466 above for setting M equal to the next requested data packet. Steps 476 through 484 are then iteratively performed, as required, for processing all requests for data packet retransmission which are included in the received message signal.

The advantages of the multicast protocol of the present invention are now highlighted by explanation of several examples. For purposes of clarity and simplicity, it is assumed that data file transfer of data packets DP 00, DP 01 ..., DP 99 is occurring from the transmitter 20 to REC-C and REC-F; that the delay timer 29 is set for zero delay; that data packets DP 05, DP 07 and DP 09 are detected as incorrect at the REC-C, and data packets DP 03 and DP 09 are detected as incorrect at REC-F; and, that RQSTs are issued after every two data packets are transmitted.

In one case, assume that the REC-C has received message signals $RQST_{1,2,3}$ and issued message signals $SRSP_{1,2,3}$ in response, and that the transmitter 20 has received these SRSPs and, in turn, retransmitted a copy of data packets DP 05, DP 07 and then DP 09. In this circumstance, $C_t$ would be incremented three times from the value 00 to 03, $V_p$ would equal "3" and V(5) would equal 1, V(7) would equal 2 and V(9) would equal 3. Further assume that after transmitter 20 retransmits a copy of DP 09, the transmitter 20 for the first time receives a response message signal from REC-F, where the message signal requests the retransmission of DP 03 and where REC-F has not received message signals transmitted from the transmitter 20 since retransmission of data packets began. At this time, $A_{t,lat}$ would be equal to "1", causing the transmitter 20 to proceed directly to step 480 and retransmit DP 03. This retransmission occurs subsequent to step 478 without the incrementation of $C_t$ because step 478 ensures, based on the value of V(3), against the possibility that a copy of DP 03 is in transit based on a retransmission which occurred during the current cycle.

In an alternate case, at the same instant in time after the transmitter 20 retransmits a copy of DP 09 following the performance of the same operations as described above, the first response message signal from REC-F received at the transmitter 20 may be a request for the retransmission of DP 09 and cause $A_{t,lat}$ not to equal "1". This circumstance may occur, for example, if the distance between REC-C and REC-F became unexpectedly shorter during the multicast session or several message signals, including some of those response message signals requesting the retransmission of DP 03, became lost in transit. In this case, step 478 would prevent the retransmission of a copy of DP 09 by the transmitter 20 because the transmitter 20 would determine that the last copy of DP 09 was recently retransmitted and in transit at the time that REC-F issued the currently received SRSP message signal.

As described above, the transmitter 20 may utilize the delay timer 29 when the bits allocated in a data field for tracking cycle progression do not introduce a sufficient compensating delay interval to avoid unnecessary retransmissions. In this circumstance, the minimum required delay timer interval for compensating the propagation delay to the furthest receiver from the transmitter may be determined from the variation in round trip delay among the receivers involved in a multicast session in accordance with the inequality:

$$L - S < (RANGE - 1)(S + D),$$

where L represents the longest expected round trip delay to any receiver, S represents the shortest expected round trip delay to any receiver and D represents the delay timer value.

S+D defines the shortest allowed time interval between changes in the value of C. To prevent ambiguities in requests for retransmissions, in other words, to prevent the value of C from wrapping back to the initial value before the transmitter should receive at least one message signal from each of the receivers involved in the multicast communication session, a succession of RANGE−1 of these shortest periods should sum to more than the difference between L and S. By manipulating the above inequality, it can be shown that D gives the minimum bound for a timer delay interval from the expression:

$$D>(L-(RANGE \times S))/(RANGE-1).$$

Since D cannot be a negative number, any situation where (RANGE)·S exceeds L permits the use of a zero value for D. In other words, any time the compensating delay interval which is provided by incrementing C exceeds the longest expected round trip interval to a receiver, it is assured that a request for retransmission will not result in an unnecessary retransmission.

It is to be understood that the embodiments and variations shown and described above are illustrative of the principles of this invention only and that various modifications may be implemented by those skilled in the art without departing from the scope and spirit of the invention.

I claim:

1. A system for selectively retransmitting data packets detected as incorrect during a transmission of a data file from a transmitter to a receiver, said data file comprising a plurality of sequentially numbered data packets, the retransmission system comprising:

the transmitter comprising a processor connected to a memory, wherein said transmitter transmits and receives message signals, said transmitted message signals including data packets and requests for status (RQST), said received message signals including responses to the RQSTs, wherein said transmitter originally transmits said data packets sequentially, and wherein said transmitter issues the RQSTS at a predetermined rate;

the receiver comprising a processor connected to a memory, wherein said receiver transmits and receives message signals, said received message signals including the data packets and the RQSTs, said transmitted message signals including the responses to the RQSTs, said responses including requests for retransmission of data packets detected as incorrect, said receiver processor being operable to detect incorrect data packets and determine the sequence number of said detected incorrect data packets, wherein said transmitter processor and said receiver processor store in the transmitter memory and receiver memory, respectively, data indicating progress of cycles of round trips of message signal retransmission between the transmitter and the receiver, and wherein each said RQST and response message signals includes a data field, each said data field including data representative of the progress of the cycles such that unnecessary retransmission of a data packet requested for retransmission in a response message signal is avoided while said requested data packet is in transit to said receiver.

2. The system of claim 1,
wherein the data stored in the transmitter memory further comprises a first data word representation indicating progress of cycles as monitored at the transmitter, counter data tracking the progress of cycles, and data indicating the last time a copy of any sequentially numbered data packet was transmitted;

wherein the data stored in the receiver memory comprises a second data word representation indicating the next expected value of the first data word stored in the transmitter memory;

wherein the processor increments the counter data value each time a cycle is completed;

wherein said transmitter processor includes in the data field of the RQST message signals a data word representation of the latest value of the first data word stored in the transmitter memory;

wherein said receiver processor includes in the data field of the response message signals a data word representation of the latest value of the second data word stored in the receiver memory; and, wherein said transmitter processor is operable to determine the progress of cycles from the data words included in the data field of a response message signal.

3. The system of claim 2, wherein each of the second data word in the receiver memory, the first data word in the transmitter memory and the data word representations included in the data fields of message signals is a single data bit.

4. The system of claim 1, wherein the transmitter retransmits a copy of a sequentially numbered data packet requested for retransmission in a response message signal upon determination that a cycle corresponding to the last transmission of a copy of the data packet is complete.

5. The system of claim 1, wherein said transmitter processor further includes in each of said data packet message signals a data field, said data field of said data packet message signal including data representative of the progress of cycles.

6. The system of claim 5, wherein said transmitter processor further includes in the data field of the data packet message signals a data word representation of a latest value of a first data word stored in the transmitter memory.

7. The system of claim 6, wherein each of a second data word stored in the receiver memory, the first data word in the transmitter memory and the data word representations included in the data fields of message signals is a single data bit.

8. The system of claim 5, wherein said receiver issues unsolicited response message signals including requests for retransmission.

9. The system of claim 1, wherein the transmitter does not retransmit a copy of a data packet requested for retransmission in a response message signal where data in the transmitter memory indicates that a cycle corresponding to the last transmission of a copy of the data packet is not complete.

10. The system of claim 1, wherein the transmitter determines that the cycle data included in the data field of a response message signal do not indicate completion of a cycle, and wherein the transmitter retransmits a copy of a data packet requested for retransmission in the response, wherein data in the transmitter memory indicates that the last transmission of a copy of the data packet did not occur during the current cycle.

11. A system for selectively retransmitting data packets detected as incorrect during transmission of a data file, said data file comprising a plurality of sequentially numbered data packets, the retransmission system comprising:

a transmitter comprising a processor connected to a memory, wherein said transmitter transmits and receives message signals, said transmitted message signals including data packets and requests for status (RQST), said received message signals including responses to the RQSTs, wherein said transmitter originally transmits said data packets sequentially, and wherein said transmitter issues the RQSTs at a predetermined rate;

a plurality of receivers, each of said receivers comprising a processor connected to a memory, wherein each said receiver transmits and receives message signals, said received message signals including the data packets and the RQSTs, said transmitted message signals including the responses to the RQSTs, said responses including requests for retransmission of data packets detected as incorrect, said receiver processor being operable to detect incorrect data packets and determine the sequence number of the detected incorrect data packets, wherein said transmitter processor and each of said receiver processors store in the transmitter memory and each of said receiver memories, respectively, data indicating progress of cycles of round trips of message signal transmissions between said transmitter and any of said plurality of receivers, and wherein each of said RQST and response message signals transmitted between each of said plurality of receivers and said transmitter includes a data field, each said data field including data representative of the progress of cycles such that unnecessary retransmission of data packets requested for retransmission in a response message signal is avoided while said requested data packets are in transit to said plurality of receivers.

12. The system of claim 11, wherein the data stored in the transmitter memory further comprises a multiple bit first data word representation indicating progress of cycles as monitored at the transmitter, counter data tracking the progress of cycles, and data indicating the last time a copy of any sequentially numbered data packet was transmitted;

wherein the data stored in the receiver memory comprises a multiple bit second data word representation indicating acknowledgements of any received cycle indications of the first data word stored in the transmitter;

wherein said transmitter processor includes in the data field of the RQST message signals a multiple bit data word representation of the latest value of the first data word stored in the transmitter memory;

wherein said receiver processor includes in the data field of the response message signals a multiple bit data word representation of the latest value of the second data word stored in the receiver memory;

wherein each said receiver processor updates the value of the second data word stored in the receiver memory according to a predetermined modulus, wherein the modulus is defined by the number of bits allocated in the data field of the message signals for representing the latest values of the second data word stored in the receiver memory at each said receiver and the latest values of the first data word stored at the transmitter memory, wherein the number of bits allocated in the data field defines a compensating delay interval, wherein said transmitter processor schedules for retransmission those data packets requested for retransmission in response message signals where the value of the data word representation included in the data field of these response message signals is equal to one greater than the current value of the first data word stored in the transmitter memory, wherein the transmitter processor increments the value of the first data word stored in the transmitter memory by one each time a sequence of data packets is retransmitted, and wherein the transmitter processor increments the value of the counter data by one for each retransmission of a sequence of data packets scheduled for retransmission such that incrementing the first data word stored in the transmitter memory provides the compensating delay interval required for compensating for the propagation delay to the receiver furthest from the transmitter for avoiding unnecessary retransmissions.

13. The system of claim 12, wherein each of the second data words stored in each of the plurality of receiver memories, respectively, the first data word stored in the transmitter memory and the data word representations included in the data fields of message signals is a two bit word.

14. The system of claim 12, wherein the transmitter retransmits a copy of a data packet requested for retransmission in a request message signal where the transmitter processor determines that the difference between the first data word stored in the transmitter memory and the value of the data word representation received in the message signal is less than the difference between the counter data value and the value of counter data at the last time a copy of the data packet was transmitted.

15. The system of claim 14, wherein the transmitter processor removes from the data packet retransmission schedule the data packet being retransmitted.

16. The system of claim 14, wherein the transmitter does not retransmit a copy of a data packet requested for retransmission in a request message signal where the transmitter determines that the difference between the value of the first data word stored in the transmitter memory and the value of the data word representation received in the message signal is not less than the difference between the value of the counter data and the value of the counter data at the last time a copy of the data packet was transmitted such that an unnecessary retransmission of the data packet is avoided.

17. The system of claim 11, wherein a copy of a data packet scheduled for retransmission is retransmitted from the transmitter when the last transmitted copy of the data packet is not in transit to the receiver requesting the retransmission.

18. The system of claim 11, wherein the processor of each said receiver discards data packets determined to be duplicate transmissions.

19. The system of claim 11, wherein a multiple bit data word representation of the progress of cycles is included in a data field of the data packet message signals, and wherein the processor of each said receiver issues unsolicited response message signals including requests for data packet retransmission.

20. The system of claim 11, wherein the transmitter processor further includes a delay timer, wherein said delay timer times out a timer delay interval, said timer delay interval delaying the retransmission of data packets scheduled for retransmission by introducing an additional delay to compensate for the propagation delay to the receiver furthest from the transmitter.

21. The system of claim 20, wherein timing of the timer delay interval by the delay timer is restarted if the transmitter processor detects from the data word representation included in the data field of the currently received response message signal that data packet retransmission is occurring too quickly to allow for compensation of the propagation delay to the receiver issuing the currently received response message signal.

22. A method for selectively retransmitting data packets detected as incorrect during transmission of data file, said data file comprising a plurality of sequentially numbered data packets, the method comprising the steps of:

(a) transmitting message signals including data packets and requests for status (RQST) from a transmitter to a receiver, said transmitter comprising a processor connected to a memory and said receiver comprising a processor connected to a memory, wherein said transmitting step further comprises originally transmitting said data packets sequentially and issuing RQSTS at a predetermined rate;

(b) receiving at said receiver the transmitted message signals including the sequentially transmitted data packets and the issued RQSTs;

(c) detecting incorrect data packets at said receiver;

(d) determining the sequence numbers of any of the data packets detected as incorrect at said receiver;

(e) transmitting from said receiver message signals including a response to an issued RQST, said response message signal including a request for retransmission of a data packet detected as incorrect;

(f) storing data in the transmitter memory and the receiver memory indicating progress of cycles of round trips of message signal retransmissions between the transmitter and the receiver;

(g) including data representative of the progress of cycles in a data field in each said RQST and response message signal said data field usable to determine whether said request for retransmission is stale; and, (h) retransmitting, as a function of said determination a copy of a sequentially numbered data packet requested for retransmission in said response message signal to thereby avoid unnecessary retransmission of said data packet while in transit to said receiver.

23. The method of claim 22, wherein step (f) further comprises the steps of:

storing in the transmitter memory a first data word representation indicating progress of cycles, counter data tracking the progress of cycles, and data indicating the last time a copy of any sequentially numbered data packet was transmitted, and storing in the receiver memory a second data word representation indicating the next expected value of the first data word stored in the transmitter memory;

wherein step (g) further comprises the steps of:

including in the data field of the RQST message signals a data word representation of the latest value of the first data word stored in the transmitter memory, and including in the data field of the response message signals a data word representation of the latest value of the second data word stored in the receiver memory;

and wherein the method of claim 22 further comprises the steps of:

(i) incrementing the counter data value each time a cycle is completed; and, (j) comparing the latest values of the first data word stored in said transmitter memory and the latest value of the second data word included in the data field of a response message signal for determining whether a cycle corresponding to a data packet retransmission has been completed.

24. The method of claim 23, wherein each of the second data word in the receiver memory, the first data word in the transmitter memory and the data word representations included in the data fields of message signals is a single data bit.

25. The method of claim 23, wherein step (g) further comprises the step of including data representative of the progress of cycles in a data field of each said data packet message signal.

26. The method of claim 25, wherein step (g) further comprises the step of including in the data field of the data packet message signals a data word representation of the latest value of the first data word Stored in the transmitter memory.

27. The method of claim 26, wherein each of the second data word in the receiver memory, the first data word in the transmitter memory and the data word representations included in the data fields of message signals is a single data bit.

28. The method of claim 25, wherein step (e) further comprises the step of transmitting from the receiver unsolicited response message signals including requests for retransmission.

29. The method of claim 22, wherein step (h) further comprises the step of preventing retransmission of a copy of a data packet requested for retransmission in a response message signal where data in the transmitter memory indicates that a cycle corresponding to the last transmission of a copy of the data packet is not complete.

30. The method of claim 22, wherein step (h) further comprises the step of retransmitting a copy of a data packet requested for retransmission in a response message signal when the transmitter processor determines that the data included in the data field of a response message signal does not indicate completion of a cycle and when data in the transmitter memory indicates that the last transmission of a copy of the data packet did not occur during the current cycle indicated by a counter data value.

31. A method for selectively retransmitting data packets detected as incorrect during transmission of a data file, said data file comprising a plurality of sequentially numbered data packets, the method comprising the steps of:

(a) transmitting message signals including data packets and requests for status (RQST) from a transmitter to at least one receiver, said transmitter comprising a processor connected to a memory and said at least one receiver comprising a processor connected to a memory, wherein said transmitting step further comprises originally transmitting said data packets sequentially and issuing RQSTs at a predetermined rate;

(b) receiving at said at least one receiver the transmitted message signals including the sequentially transmitted data packets and the issued RQSTs;

(c) detecting incorrect data packets at said at least one receiver;

(d) determining the sequence numbers of any of the data packets detected as incorrect at said at least one receiver;

(e) transmitting from said at least one receiver message signals including a response to an issued RQST including a request for retransmission of a data packet detected as incorrect;

(f) storing data in the transmitter memory and the receiver memory of said at least one receiver indicating progress of cycles of round trips of message signal transmissions between said transmitter and said at least one receiver;

(g) including data representative of the progress of cycles in a data field of each of said RQST and response message signals transmitted between said at least one receiver and said transmitter, said data field usable to determine whether said request for retransmission is stale; and, (h) retransmitting, as a function of said determination, a copy of a sequentially numbered data packet requested for retransmission in said response message signal upon determination that propagation delay to the receiver furthest from the transmitter has been compensated and a cycle corresponding to the last transmission of a copy of the data packet is complete to thereby avoid unnecessary retransmission of said data packet while in transit to said at least one receiver.

32. The method of claim 31, wherein step (f) further comprises the steps of storing in the transmitter memory a multiple bit first data word representation indicating progress of cycles, counter data tracking the progress of Cycles, and data indicating the last time a copy of any sequentially numbered data packet was transmitted, and storing in said at least one receiver memory a multiple bit second data word representation indicating acknowledgements of any received cycle indications of the first data word stored in the transmitter;

wherein the step (g) further comprises the steps of:

including in the data field of the RQST message signals a multiple bit data word representation of the latest value of the first data word stored in the transmitter memory, and including in the data field of the response message signals data a multiple bit data word representation of the latest value of the second data word stored in the said at least one receiver memory;

and wherein the method of claim 31 further comprises the steps of:

(i) updating the value of the second data word stored in the said at least one receiver memory according to a predetermined modulus, wherein the modulus is defined by the number of bits allocated in the data field of the message signals for representing the latest values of the second data word stored in the said at least one receiver memory and the latest values of the first data word stored at the transmitter memory, wherein the number of bits allocated in the data field defines a compensating delay interval;

(j) scheduling for retransmission those data packets requested for retransmission in response message signals where the value of the data word representation included in the data field of these response message signals is equal to one greater than the current value of the first data word stored in the transmitter memory;

(k) incrementing the value of the first data word stored in the transmitter memory by one each time a sequence of data packets is retransmitted; and (l) incrementing the value of the counter data by one for each retransmission of a sequence of data packets scheduled for retransmission such that incrementing the first data word stored in the transmitter memory provides the compensating delay interval required for compensating for the propagation delay to the receiver furthest from the transmitter for avoiding unnecessary retransmissions.

33. The method of claim 32, wherein each of the second data word stored in said at least one receiver, the first data word stored in the transmitter memory and the data word representations included in the data fields of message signals is a two bit word.

34. The method of claim 32, wherein step (h) further comprises the step of:

retransmitting a copy of a data packet requested for retransmission in a request message signal where the transmitter determines that the difference between the first data word stored in the transmitter memory and the value of the data word representation received in the message signal is less than the difference between the counter data value and the value of counter data at the last time a copy of the data packet was transmitted.

35. The method of claim 34, wherein step (j) further comprises the step of:

removing from the data packet retransmission schedule the data packet being retransmitted.

36. The method of claim 31, wherein the step (h) further comprises the step of:

retransmitting a copy of a data packet scheduled for retransmission when the last copy of the data packet is not in transit to said at least one receiver requesting the retransmission.

37. The method of claim 36, further comprising the step of:

(m) discarding at said at least one receiver data packets determined to be duplicate transmissions.

38. The method of claim 31, wherein step (g) further comprises the step of including a multiple bit data word representation of the progress of cycles in a data field of the data packet message signals, and wherein step (h) further comprises the step of transmitting from said at least one receiver unsolicited response message signals including requests for data packet retransmission.

39. The method of claim 31, further comprising the step of:

(m) timing out a timer delay interval at said transmitter for delaying the retransmission of data packets scheduled for retransmission for introducing an additional delay to compensate for the propagation delay to the receiver furthest from the transmitter.

40. The method of claim 39, wherein step (m) further comprises the step of restarting timing of the timer delay interval if the transmitter processor detects from the data word representation included in the data field of the currently received response message signal that data packet retransmission is occurring too quickly to allow for compensation of the propagation delay to said at least one receiver transmitting the currently received response message signal.

41. The method of claim 31, wherein step (h) further comprises the step of:

preventing the retransmission of a copy of a data packet requested for retransmission in a request message signal where the transmitter determines that the difference between the value of the first data word stored in the transmitter memory and the value of the data word representation received in the message signal is not less than the difference between the value of the counter data and the value of the counter data at the last time a copy of the data packet was transmitted such that an unnecessary retransmission of the data packet is avoided.

42. A system for communicating a plurality of data packets among a transmitter and at least one receiver, comprising:

said transmitter that transmits said plurality of data packets to said at least one receiver;

said at least one receiver, communicable with said transmitter, that receives said transmitted plurality of data packets from said transmitter and is capable of requesting retransmission of at least one of said transmitted plurality of data packets; and circuitry, associated with at least one memory that stores retransmission cycle information, that uses said retransmission cycle information to avoid unnecessary retransmission of said requested at least one of said transmitted plurality of data packets among said transmitter and said receiver when said requested at least one of said transmitted plurality of data packets may be in transit to said receiver.

43. A method of operating a system for communicating a plurality of data packets among a transmitter and at least one receiver, comprising the steps of:

transmitting said plurality of data packets from said transmitter to said at least one receiver;

receiving said transmitted plurality of data packets at said at least one receiver from said transmitter, and selectively requesting retransmission of at least one of said transmitted plurality of data packets; and avoiding unnecessary retransmission of said requested at least one of said transmitted plurality of data packets among said transmitter and said receiver in response to retransmission cycle information stored in at least one memory, said unnecessary retransmission avoided when said requested at least one of said transmitted plurality of data packets may be in transit to said receiver.

* * * * *

UNITED STATES PATENT AND TRADEMARK OFFICE
CERTIFICATE OF CORRECTION

PATENT NO. : 5,664,091
DATED : September 2, 1997
INVENTOR(S) : Henry D. Keen

It is certified that error appears in the above-indentified patent and that said Letters Patent is hereby corrected as shown below:

Title Page, Line (54) delete "A VOIDING" and substitute -- AVOIDING --.

Column 1, line 1, delete "A VOIDING" and substitute -- AVOIDING --.

Column 19, line 41, delete "RQSTS" and substitute -- RQSTs --.

Column 23, line 19, delete "RQSTS" and substitute -- RQSTs --.

Column 23, line 38, after "signal" insert -- , --.

Column 23, line 39, after "determination" insert -- , --.

Column 24, line 19, delete "Stored" and substitute -- stored --.

Column 25, line 26, delete "Cycles" and substitute -- cycles --.

Signed and Sealed this

Thirtieth Day of December, 1997

*Attest:*

BRUCE LEHMAN

*Attesting Officer*     *Commissioner of Patents and Trademarks*